(12) United States Patent
Belarbi

(10) Patent No.: US 6,216,399 B1
(45) Date of Patent: Apr. 17, 2001

(54) FLOOD PROTECTION DEVICE

(75) Inventor: Sahbi Belarbi, Malmö (SE)

(73) Assignee: Flood Protection Systems Bebarli AB, Malmo (SE)

( * ) Notice: Subject to any disclaimer, the term of this patent is extended or adjusted under 35 U.S.C. 154(b) by 0 days.

(21) Appl. No.: 09/068,486

(22) PCT Filed: Nov. 13, 1996

(86) PCT No.: PCT/SE96/01462

§ 371 Date: May 12, 1998

§ 102(e) Date: May 12, 1998

(87) PCT Pub. No.: WO97/18369

PCT Pub. Date: May 22, 1997

(30) Foreign Application Priority Data

Nov. 14, 1995 (SE) .................................................. 9504024

(51) Int. Cl.$^7$ .................................................. E02D 19/00
(52) U.S. Cl. ...................... 52/169.14; 52/1; 52/DIG. 12; 160/23.1; 405/114; 405/115
(58) Field of Search ...................... 160/23.1, 37; 405/15, 405/107, 113, 114, 115; 52/2.13, 2.24, 2.25, 23, 27, 58, 60, 64, 169.12, 169.14, 222, 506.01, 573.1, 582.1, DIG. 12

(56) References Cited

U.S. PATENT DOCUMENTS

| 486,459 | 11/1892 | Gerhard . |
| 2,271,143 | 1/1942 | Martinus . |
| 2,961,255 | 11/1960 | Trott . |
| 3,715,843 | 2/1973 | Ballinger . |
| 4,019,304 | 4/1977 | Timm . |
| 4,204,372 | * 5/1980 | Agopyan ..................................... 52/64 |
| 4,252,461 | * 2/1981 | Colamussi et al. .................... 405/115 |
| 4,314,774 | * 2/1982 | Tsuji et al. ............................. 405/115 |
| 4,321,774 | * 3/1982 | Fish ................................. 52/169.14 X |
| 4,375,929 | * 3/1983 | Clark ............................... 52/169.14 X |
| 4,425,744 | 1/1984 | Villareal . |
| 4,488,386 | 12/1984 | Thompson . |
| 4,565,468 | * 1/1986 | Crawford ....................... 52/169.14 X |
| 4,693,042 | 9/1987 | Villareal . |
| 5,374,133 | * 12/1994 | Lazes et al. ............................ 405/68 |
| 5,852,899 | * 12/1998 | Finley .................................... 52/2.24 |

FOREIGN PATENT DOCUMENTS

| 2 531 475 | 2/1987 | (FR) . |
| 2 106 165 | 4/1983 | (GB) . |

\* cited by examiner

Primary Examiner—Carl D. Friedman
Assistant Examiner—Kevin D. Wilkens
(74) Attorney, Agent, or Firm—Mathews, Collins, Shepherd & Gould

(57) ABSTRACT

A protective device for flooding, comprising a protective cloth provided in a housing and a float connected to the protective cloth. The housing is formed as boxes having elongated sides and open gable ends. Side edges of the protective cloth in the housing are connected to one another for providing a waterproof connection to protective cloths of adjacent housings. A protective cloth for flooding comprises at least one float provided along an edge of the protective cloth, and float elements are provided spaced apart along the surface of the protective cloth.

4 Claims, 2 Drawing Sheets

FLOOD PROTECTION DEVICE

TECHNICAL FIELD

In connection with flooding from rivers and lakes substantial damages are caused on buildings situated at a low level above a normal water line. A rise of the water line will mean that the building is filled with water or water damaged.

The invention relates to a device for protecting buildings from flooding.

PRIOR ART

From prior art documents it is previously known to provide below the ground surface around the building a folded or wound shield or protective device formed as a cloth or similar device. The shield can be pulled up to cover the face of the building. U.S. Pat. No. 4,488,386 discloses such a shield. A plurality of boxes enclosing the shield is disposed below the ground level adjacent to the face. The boxes are attached to the face of the building. Means are provided at some distance above the ground level for fastening the pulled out shield.

FR 2531475 discloses a similar shield. In this case the shield is fastened directly to the ground of the building below the ground level. Furthermore, the shield is provided with floating means that will lift the shield to place an upper edge thereof above the water level.

The prior art embodiments exhibit drawbacks since the shield, or the box in which the shield is stored, is fastened in the building. Regarding FR 2531475 there is required also a substantial construction work for the attachment of the shield.

In either of the shown embodiments the protective device is designed separately for each single building and comprises individually designed means for attaching the protective device to the building.

SUMMARY OF THE INVENTION

An object of the invention is to provide a protective device that will accomplish an efficient protection when flooding occurs while at the same time be mounted in a simple way in different types of buildings. Furthermore, no rebuilding should be required when the protective device is mounted and used.

The protective device according to the invention is provided in modular form, different modules being combined and connected to each other to adjust to the shape of the building. Each of the modules is prefabricated and disposed in shallow ditches or holes in the ground around the building. The protective cloths enclosed in the modules are connected to each other so as to be waterproof in connection with arranging them in the holes. A specially designed corner module is used to close the protective device around the corners of the building.

When flooding is impending activation of the protective device is prepared. If flooding water reaches the protective device the protective cloth is lifted automatically by means of a float. Additionally advancing water may press the cloth towards the building but water is prevented from penetrating into the building.

BRIEF DESCRIPTION OF THE DRAWINGS

The invention will now be described in more detail, reference being made to the accompanying drawings, in which.

DETAILED DESCRIPTION

Figure 1:
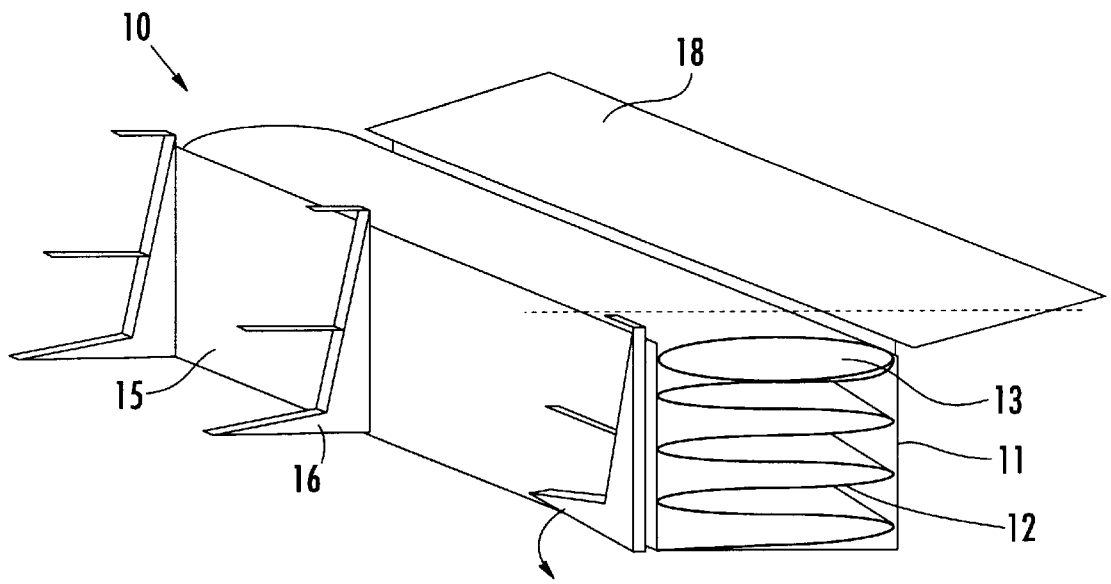
FIG. 1 is a general perspective view showing one embodiment of a protective device according to the invention.

The protective device 10 shown in FIG. 1 comprises a plurality of modules or housings formed as boxes 11. The boxes are provided with elongated side parts 15 and a cover 18 that can be opened. In use a plurality of housings are connected in open gable-ends but during storing and transporting the box 11 can be provided with gable-walls.

The box 11 comprises a protective cloth 12 which is rolled or folded so as to be accommodated within the box. The protective cloth 12 is attached to a float 13 in an end closest to the cover 18. In a simple embodiment the float 13 comprises a light body that provides a lift buoyancy strong enough to lift the complete protective cloth. The float 13 can also comprise a plurality of separated sections. In a developed embodiment the float 13 comprises a leakproof and extensible first container and a second container connected thereto, said second container comprising a pressurised gaseous medium.

In use the boxes 11 are disposed at least partly below ground level and have to be kept there even when the protective cloth is rolled out or unfolded and lifted by the float 13. For that reason attaching means are provided on the box 11. In a simple embodiment they are formed as a bottom plate 17, the dimensions thereof exceeding the bottom surface of the box. In some applications the attaching means are formed as L shaped brackets 16, the longer stem thereof pivotally arranged on the side parts of the box 11. After disposing the box 11 in a hollow having dimensions only marginally larger than the dimensions of the box the brackets 16 can be pivoted out from a first position next to the box 11 to a pivoted second position in which they will prevent the box from moving upwards when lifting forces from the float 13 arises.

Figure 2:
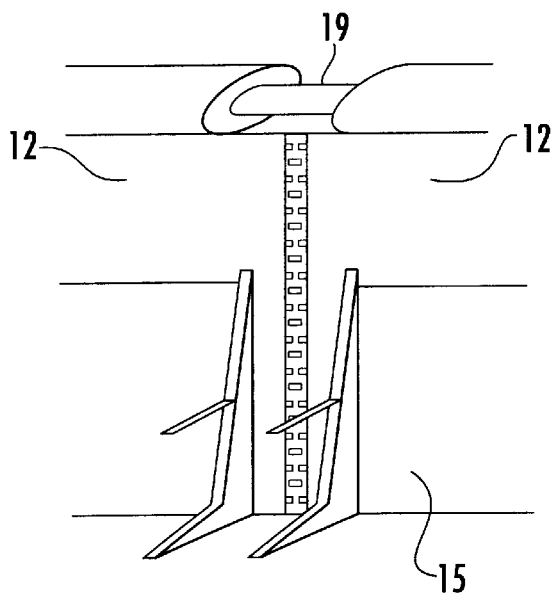
FIG. 2 is a general perspective view showing the assembling of two elements comprised in a protective device according to the invention.

At the assembling of modules or boxes it should be noted that it is primarily the protective cloths 12 that have to be connected so as to be water proof. In FIG. 2 two boxes are disposed close to each other and the protective cloths 12 of the boxes 11 are connected to each other. To facilitate the assembling at the location by the building the joint of the cloths preferably should be formed in a simple way. One appropriate embodiment comprises a zip fastener but also other types of connecting means can be used, such as glued joints. Preferably the protective cloths are connected before disposing the boxes 11 in the cavities dug out. According to the embodiment including a float formed as an extensible leakproof container connecting tubes 19 are provided between different containers so as to keep the number of gas holders down.

Figure 3:
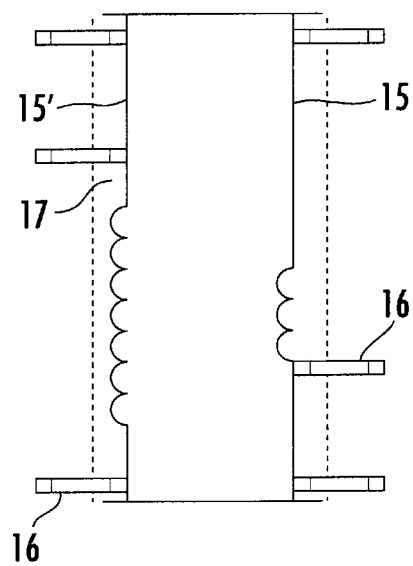
FIG. 3 is a view from above showing a corner module comprised in an embodiment of the invention.

Specially designed corner modules are provided for the corners of the buildings. Such a module is shown in FIG. 3 and as can be seen one side section 15 is provided with a shorter part made of folded or wave shaped material and the other side section 15' with a longer similar part. The folded or waved parts will allow bending of the box in 90° protecting also the corners.

The modules will be available in standard lengths, and after measuring the outer dimensions of the building the required number of running meters is obtained, including the number of required corner modules. A cavity is dug on a suitable distance from the building preferably large enough to receive the complete box. The protective cloths 12 are rolled out and connected to each other, and then again rolled or folded to be accommodated within the boxes. The boxes can also be connected to each other. Then all boxes are put into the cavities and the covers 18 are put on.

The covers 18 and some parts of the boxes can be visible and will then form a kind of wall around the building. It is also possible to completely conceal the boxes 11 and covers 18, for instance by flowerbeds or grass.

In embodiments comprising simple floats 13 the covers are uncovered and possibly opened when flooding is expected. As soon as water will reach the box the floats will lift the continuous protective cloth and prevent water from passing by. When the water level is increased the water will move the protective cloth towards the building and the lift the protective cloth up along the face of the building.

If extensible containers are used they can be made strong and the gaseous pressure so high that the extensible containers can press the cover up by an increasing pressure even if the cover is covered by a thin layer of soil. In a more developed embodiment sensors are provided for sensing a rising water level and the covers can be opened automatically.

For smaller buildings the protective device according to the invention preferably is provided to completely surround the building. In urban areas it is possible to protect also blocks or districts along channels and rivers. In the latter case the boxes can be covered under pavements or the like.

The protective device according to the invention can be used also to improve the waterproof properties of safety walls or similar structures. For such applications the protective device according to the invention is provided at the base of the safety wall at the river side of the wall. When the water level rises the protective cloth automatically will slide up along the edge of the wall and keep the water away. If supporting piles or similar devices are provided behind the wall the protective cloth may rise even over the height of the wall and still keep away the water.

A protective device according to the invention can be used also to form a water container. By constructing a shallow dam having safety walls and by providing spaced apart supporting means such as piles or similar devices it is possible to achieve a water level that will substantially exceed the depth of the dam.

After use the protective cloth can again be rolled or folded together and again disposed in the housings. It is also possible to dug out the housings and then move the protective device to another location for other purposes.

By producing the housings in modules having fixed lengths a larger scale production is facilitated and the price can be kept low. It would be possible also to keep the device in stock to make it available for different types of buildings and other applications. Since the connection of the protective cloths is prepared also the final assembling can be made without assistance from a professional. Since the complete protective device is detached from the building no modification of the building or the building site is required.

Figure 4:
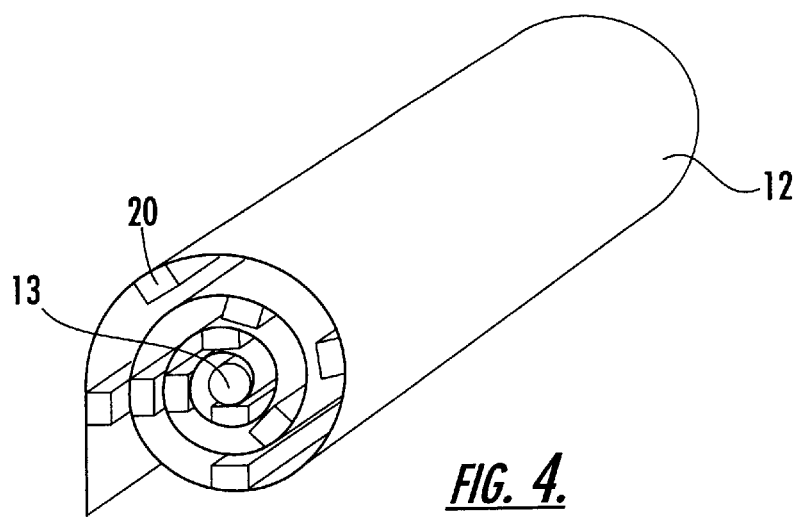
FIG. 4 is a perspective view of a wound up protective device according to an alternative embodiment.
Figure 5:
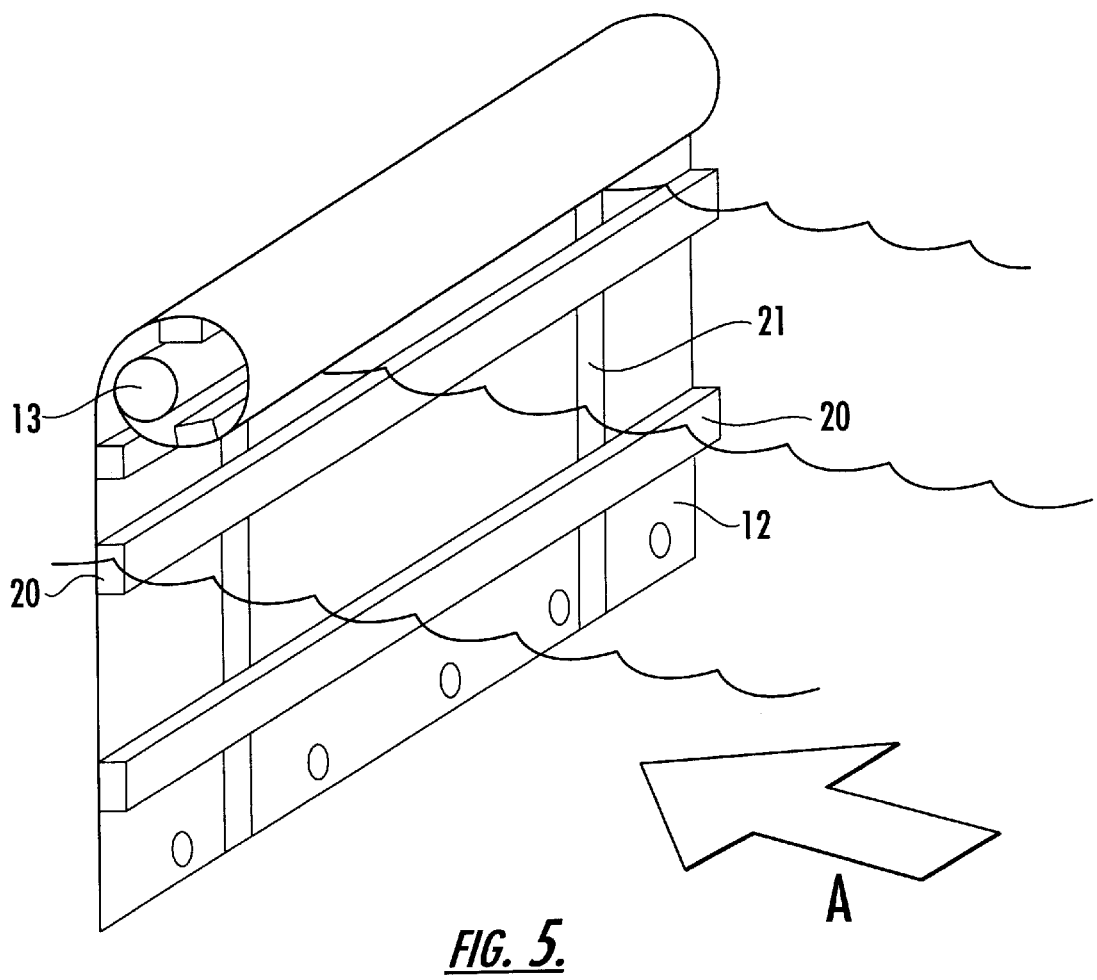
FIG. 5 is a perspective view of the embodiment according to FIG. 4 but partly rolled out.

In the embodiment shown in FIG. 4 and FIG. 5 the lift buoyancy has been improved and distributed over the protective cloth 12 by a plurality of elongated float elements 20. By rolling the protective cloth 12 as shown in FIG. 4 and orient the protective cloth 12 in relation to incoming water in the direction of the arrow A in FIG. 5 an efficient winding of the protective cloth is ensured. It is also appropriate to provide the protective cloth 12 with biasing means 21 along the protective cloth for the rolling thereof. The rolling of the protective cloth 12 is highly facilitated when the water level has been normalized. In a further alternative embodiment the floating elements 20 have been integrated in the protective cloth to make it floating as such.

The embodiments according to FIG. 4 and FIG. 5 will also facilitate the attachment and use of the protective cloth 12. In the most basic version the protective cloth 12 is attached directly to the base of the building or adjacent soil not until the rising water level is threatening. The biasing means 21 then facilitates the handling of the protective cloth 12 because the protective cloth 12 remains rolled until the water level rises. The chosen winding direction in relation to the direction of the flow of water will also decrease the possibility that the protective cloth 12 will catch an extending part of the building during rolling.

Such a method of rolling is of course preferred in connection with the embodiments according to FIG. 1–3. In these embodiments the biasing means 21 can comprise also some kind of brake against a disordered unwinding to avoid the possibility for forming folds or jamming.

The float 13 and the floating elements 20 are made from water resistant materials having an appropriate buoyancy, such as expanded plastic. The protective cloth is made of wear resistant and water resistant material, such as plastic, which can be reinforced by a stronger material, for instance glass fibre, rubber or a nylon or fiberglass mesh material such as KEVLAR®. KEVLAR® is a registered trademark of DuPont.

What is claimed is:

1. A protective device for use in flooding, said device comprising:
   at least one housing comprising:
   a box have elongated side walls and open gable ends;
   a protective cloth disposed in said box, said cloth having side edges which include connecting means for forming a waterproof connection to protective cloths of adjacent housings;
   a float connected to said protective cloth; and
   biasing means for rolling said protective cloth, said biasing means being along said protective cloth.

2. A protective device for use in flooding, said device comprising:

at least one housing comprising:

a box having elongated side walls and open gable ends;

a protective cloth disposed in said box, said cloth having side edges which include connecting means for forming a waterproof connection to protective cloths of adjacent housings;

a float connected to said protective cloth; and anchoring means comprising brackets pivotally connected to said side walls of said box, said brackets being rotatable in a horizontal plane.

3. A protective device for use in flooding, said device comprising:

at least one housing comprising:

a box have elongated side walls and open gable ends;

a protective cloth disposed in said box, said cloth having side edges which include connecting means for forming a waterproof connection to protective cloths of adjacent housings; and a float connected to said protective cloth, wherein at least one of said side walls of said box include means for enabling said box to bend.

4. A protective cloth for use in flooding, the cloth having a first side edge and a second side edge opposite said first side edge, the cloth further comprising:

a float disposed along said first edge of said protective cloth;

a plurality of spaced apart float elements distributed along a surface of said protective cloth; and biasing means for rolling said protective cloth, said biasing means positioned along said surface of said protective cloth;

wherein said protective cloth can be rolled or folded.

* * * * *

UNITED STATES PATENT AND TRADEMARK OFFICE
CERTIFICATE OF CORRECTION

PATENT NO. : 6,216,399 B1
DATED : April 17, 2001
INVENTOR(S) : Sahbi Belarbi

It is certified that error appears in the above-identified patent and that said Letters Patent is hereby corrected as shown below:

<u>Title page,</u>
Item [73] Assignee, correct Assignee to read: -- Flood Protection Systems Belarbi AB, Malmo, Sweden --

Signed and Sealed this

Fifth Day of March, 2002

Attest:

JAMES E. ROGAN
*Attesting Officer*     *Director of the United States Patent and Trademark Office*